(12) United States Patent
Lawrence et al.

(10) Patent No.: US 6,385,459 B1
(45) Date of Patent: May 7, 2002

(54) METHOD OF HANDLING AN EVENT BY A PLURALITY OF CONSOLES

(75) Inventors: Peter Robert Lawrence, Elgin; Steppen Aman Yi, Lisle; Larry Michael Peterson, West Dundee, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/238,527

(22) Filed: Jan. 27, 1999

Related U.S. Application Data

(60) Provisional application No. 60/106,310, filed on Oct. 30, 1998.

(51) Int. Cl.⁷ .............................. H04B 7/00; H04Q 7/20
(52) U.S. Cl. ........................ 455/508; 455/404; 455/521
(58) Field of Search ................................. 455/507, 508, 455/518, 519, 521, 404; 340/961; 701/120; 379/268, 269; 345/736, 761; 709/318

(56) References Cited

U.S. PATENT DOCUMENTS

| | | | |
|---|---|---|---|
| 3,678,391 A | * 7/1972 | Gough | 370/313 |
| 4,926,495 A | * 5/1990 | Comroe et al. | 455/54 |
| 5,122,959 A | * 6/1992 | Nathanson et al. | 701/117 |
| 5,200,954 A | * 4/1993 | Teel, Jr. et al. | 370/94.1 |
| 5,754,960 A | * 5/1998 | Downs et al. | 455/508 |
| 6,125,311 A | * 9/2000 | Lo | 701/29 |
| 6,243,452 B1 | * 6/2001 | OShaughnessey et al. | 379/201 |

FOREIGN PATENT DOCUMENTS

WO  91/03885  * 3/1991  ............ H04B/1/38

* cited by examiner

Primary Examiner—Dwayne Bost
Assistant Examiner—Miguel D. Green
(74) Attorney, Agent, or Firm—Susan L. Lukasik; Steven R. Santema

(57) ABSTRACT

A method of handling an event by a plurality of consoles includes the steps of receiving an event (519) at a communication system and displaying the event at the consoles (101 and 117), wherein the event is displayed (525) using a first manner of display on each of the consoles (101 and 117). When the event is recognized (505) by a first console (101 and 117), the event is displayed (509) on the first console using a second manner of display in response to the recognition, and each of the consoles that is not the first console continues displaying (525) the event using the first manner of display. After the event is responded (511) to by a second console, the event is displayed (527) on the consoles using a third manner of display. After the event is responded to, the event is deleted (515) by a deleting console, and the event is displayed (533) on the consoles that is not the deleting console using a fourth manner of display and the displaying of the event is discontinued on the deleting console.

15 Claims, 3 Drawing Sheets

METHOD OF HANDLING AN EVENT BY A PLURALITY OF CONSOLES

The present application is based on prior U.S. application No. 60/106,310, filed on Oct. 30, 1998, which is hereby incorporated by reference, and priority thereto for common subject matter is hereby claimed.

FIELD OF THE INVENTION

This invention relates to communication systems, including but not limited to consoles for use in radio frequency (RF) communication systems.

BACKGROUND OF THE INVENTION

The basic operation and structure of a land mobile radio system is well known. Land mobile radio systems typically comprise one or more radio communication units (e.g., vehicle-mounted mobiles, portable radios, or dispatch consoles in a land mobile system and radio/telephones in a cellular system) and one or more repeaters that transceive information via RF communication resources. These communication resources, which may be used as voice and/or data resources, may be narrow band frequency modulated channels, time division multiplex slots, carrier frequencies, frequency pairs, spreading patterns, wireline telephone lines, and so forth. Land mobile radio systems may be organized as trunked communication systems, where a plurality of communication resources is allocated amongst a group of users by assigning the repeaters on a communication-by-communication basis with an RF coverage area. Land mobile radio systems may be organized as conventional (or non-trunked) radio systems, where communication resources are dedicated to one or more groups of users.

Dispatch consoles, also referred to as consoles, may be part of an RF communication system and are connected to the other fixed portions of the system (i.e., the infrastructure) via wire connections. Dispatch consoles may each control a multiplicity of communications resources or talkgroups and may communicate on these communications resources singly or simultaneously. In some communication systems, dispatch consoles process radio events, such as emergency alarms, change requests, and status events, that are sent by radio users. In order to insure that events are not lost in the system, each event may be displayed on several dispatch consoles. In this manner, several dispatchers are made aware of the event, such that the first available dispatcher will be able to handle the event. Nevertheless, displaying an event to several dispatchers may cause confusion with respect to who should handle the event, as well as later in the life cycle of the event when attempting to analyze what happened in the resolution of the event by the dispatcher.

Accordingly, there is a need for a console that provides dispatchers with the ability to easily manage events while properly communicating with other dispatchers with respect to the handling of an event.

DESCRIPTION OF A PREFERRED EMBODIMENT

Figure 1:
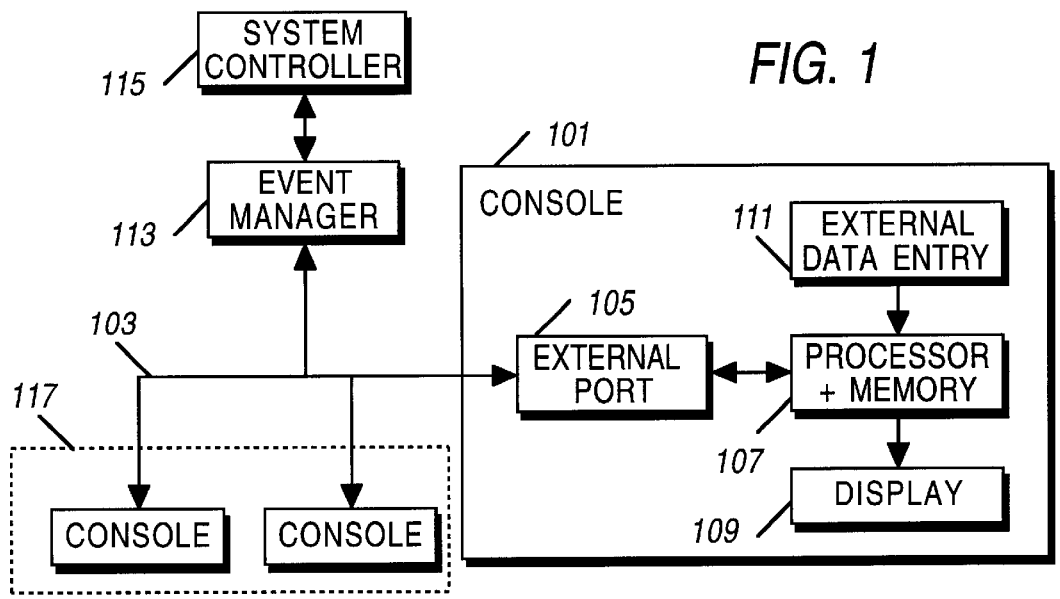
FIG. 1 is a block diagram showing consoles and an event manager in accordance with the invention.

The following describes an apparatus for and method of processing and displaying events on a console in a communication system such that various states of events are readily distinguishable between consoles acting in various manners on an event and consoles not taking actions on an event. Easy and fast distinction between events is made possible by different manners of display that correspond to various combinations of the state of the event and which device placed the event in the state. An audit trail for each event is provided through archiving of each event and its states. Each device maintains its own storage of the present state of each event. In the event of a system or hardware crash, the status of each event is obtainable at the event manager.

In accordance with the present invention, a method of handling an event by a plurality of consoles comprises the steps of receiving an event at a communication system and displaying the event at at least two of the plurality of consoles, wherein the event is displayed using a first manner of indication on each of the at least two of the plurality of consoles. When the event is recognized by a first console of the at least two consoles, the event is displayed on the first console using a second manner of indication in response to the recognition, and each of the at least two consoles that is not the first console continues displaying the event using the first manner of indication. The event is responded to by a second console. After the event is responded to by the second console of the at least two consoles, the event is displayed on the at least two consoles using a third manner of indication. At least two of the first manner of indication, the second manner of indication, and the third manner of indication are different from each other.

Additional features include the following. The method may further comprise the step of, after the event is responded to, deleting the event, by a deleting console of the at least two consoles, and displaying the event on each of the at least two consoles that is not the deleting console using a fourth manner of indication and discontinuing the displaying of the event on the deleting console, wherein the first manner of indication, the second manner of indication, and the third manner of indication are each different from the fourth manner of indication. The method may further comprise the step of archiving the event upon deletion. The method may further comprise the step of, after the step of deleting, the step of clearing the event from display, by any of the at least two consoles that is not the deleting console, without affecting display of the event on any other of the at least two consoles. The method may further comprise the steps of tracking event information, including the deleting console's identification and when the event was responded to, and which of the at least two consoles deleted the event and when the event was deleted, and displaying the event information on one or more of the at least two consoles. The method may further comprise the step of, after the event is deleted, reviewing the event on one or more of the at least two consoles that is not the deleting console by selecting the event in its fourth manner of indication. The method may further comprise the step of, after deletion of the event, responding to the event by one of the at least two consoles, and after the one of the at least two consoles responds to the event, displaying the event on the one of the at least two consoles using the third manner of indication. The first console may be the second console.

In accordance with the present invention, another method of handling an event by a plurality of consoles comprises the steps of receiving an event at a communication system; displaying the event at at least two of the plurality of consoles, wherein the event is displayed using a first manner of indication on each of the at least two of the plurality of consoles; and when the event is recognized by a first console of the at least two consoles, displaying the event on the first console using a second manner of indication in response to the recognition, and each of the at least two consoles that is not the first console continues displaying the event using the first manner of indication. The event is deleted by a deleting console of the at least two consoles, and the event is displayed on each of the at least two consoles that is not the deleting console using a third manner of indication and discontinuing the displaying of the event on the deleting console. At least two of the first manner of indication, the second manner of indication, and the third manner of indication are different from each other.

Additional features include the following. The method may further comprise the step of archiving the event upon deletion. The method may further comprise the step of, after the step of deleting, clearing the event from display, by any of the at least two consoles that is not the deleting console, without affecting display of the event on any other of the at least two consoles. The method may further comprise the steps of tracking event information, including the deleting console's identification and when the event was deleted, and displaying the event information on one or more of the at least two consoles. The method may further comprise the step of, after the event is deleted, reviewing the event on one or more of the at least two consoles that is not the deleting console by selecting the event in its third manner of indication. The method may further comprise the step of, after deletion of the event, responding to the event by one of the at least two consoles, and after the one of the at least two consoles responds to the event, displaying the event on the one of the at least two consoles using a fourth manner of indication, wherein the first manner of indication, the second manner of indication, and the third manner of indication are each different from the fourth manner of indication. The first console may be the second console.

In accordance with the present invention, another method of handling an event by a plurality of consoles comprises the steps of, when an event is received at a communication system, placing the event in an received state; displaying events in the received state at at least two of the plurality of consoles, wherein the events in the received state are displayed using a first manner of indication on each of the at least two of the plurality of consoles; and when the event is recognized by a first console of the at least two consoles, placing the event in a recognized state and noting the first console as the recognizing console for the event. Events in the recognized state are displayed on the recognizing console for each event using a second manner of indication in response to the recognition. When the event is responded to by a second console, the event is placed in a responded state. Events in the responded state are displayed on the at least two of the plurality of consoles using a third manner of indication. At least two of the first manner of indication, the second manner of indication, and the third manner of indication are different from each other.

Additional features include the following. The method may further comprise the steps of, when the event is deleted by one of the at least two consoles, placing the event in a deleted state, and noting the one of the at least two consoles as the deleting console for the event; displaying events in the deleted state on all but the deleting console for each event using a fourth manner of indication for each event and discontinuing displaying of events in the deleted state on the deleting console for each event; and wherein the first manner of indication, the second manner of indication, and the third manner of indication are each different from the fourth manner of indication. The method may further comprise the steps of, after deletion of the event, responding to the event by a converting console of the at least two consoles, and placing the event in the responded state. The method may further comprise the steps of, after deletion of the event, responding to the event by a converting console of the at least two consoles, and placing the event in the received state.

A block diagram showing consoles and an event manager is shown in FIG. 1. A console generally is a device providing a communication interface between an operator and a dispatch communication system, such as radio communication systems. A console 101, such as a CENTRACOM GOLD ELITE™ console available from Motorola, Inc., in the preferred embodiment, communicates via an external line or bus 103, such as an ethernet LAN (local area network) or an IP (internet protocol) network, to receive and transmit data with an event manager 113. The external bus 103 may communicate between many consoles 117 and the event manager 113. The information is received through an external port 105, such as an ethernet or network interface card, of the console, which port 105 generally receives and forwards the information to a processor, including memory, 107 within the console 101. The processor 107 receives status updates for each event to be displayed on the console and decides which manner of display (i.e., which manner of indication for the event) is appropriate for displaying the particular event to be displayed on the display 109. The display 109 may be a buttons and LEDs (light emitting diodes) arrangement, a CRT (cathode ray tube) monitor, an X-terminal, and so forth.

An external data entry device 111 such as a keyboard, mouse, touch screen CRT, and/or multiple key arrangement is used to enter operator commands into the console processor 107. One of skill in the art would recognize that other hardware and software are present in a console 101. One or more additional consoles 117 are typically connected to the event manager 113. The event manager 113 performs the tasks of processing inbound events from communication units and status changes from consoles 101 and 117, in addition to those tasks shown and described with respect to FIG. 2, by transmitting and receiving messages, including event status, between the event manager 113 and the consoles 101 and 117 via the external bus 103. The event manager 113 receives system information, such as events requiring processing and/or handling, from a system controller 115, such as a Zone Controller or Central Site Controller available from Motorola, Inc. The event manager 113 is generally comprised of a software application for use on a computer, such as a Radio Control Manager available from Motorola, Inc.

Figure 2:
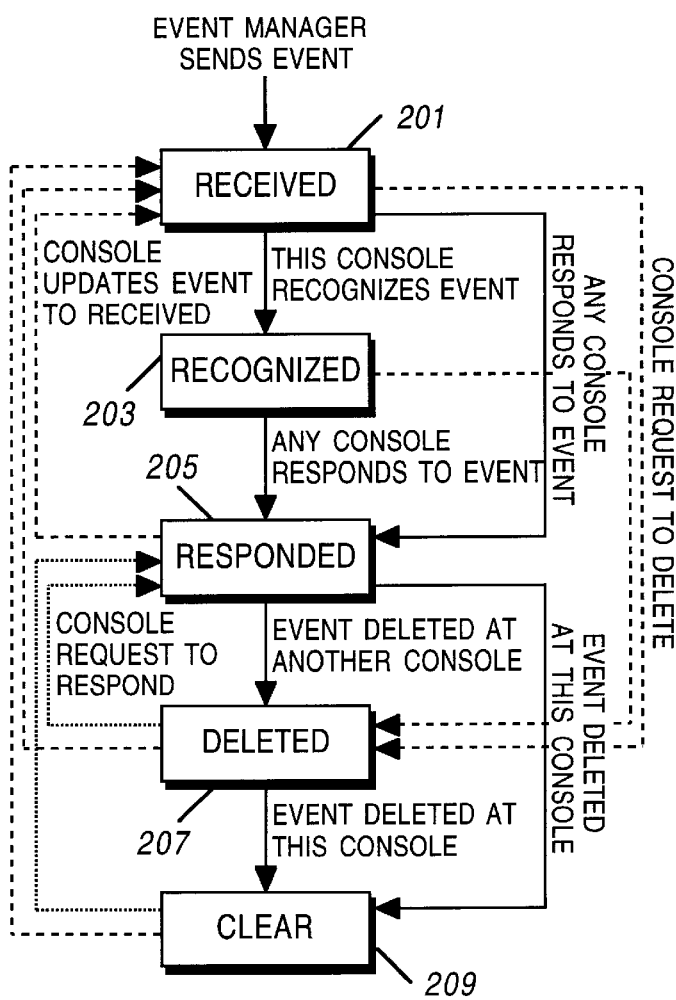
FIG. 2 is a state diagram showing the various states of an event at a console in accordance with the invention.

A state diagram showing the various states of an event at a console is shown in FIG. 2. Examples of events include emergency alarms, radio status, radio messages, talkgroup change requests, and so forth. A console 101 is able to distinguish between five different states: received 201, recognized 203, responded 205, deleted 207, and clear 209. An event enters a console via the event manager 113 in the preferred embodiment and is placed in the received state. In the preferred embodiment, an event is initially received at a communication system after a communication unit, such as a portable or mobile radio, transmits a message including, for example, a request for assistance, status update, a communication, and other messages requiring dispatcher action. The system controller 115 processes the message into an event and forwards it to the event manager 113, which places the event in the received state 201. An event may change from the received state 201 to the recognized state 203 when the console utilizing the state diagram recognizes the particular event. An event is considered to be recognized when the console operator selects the event but does nothing more in the preferred embodiment.

An event moves from either the received state 201 or the recognized state 203 to the responded state 205 when any console in the system responds to the event. In the preferred embodiment, an event has been responded to if one of the consoles 101 or 117 selects the event and begins to process the event in a responsive manner, such as selecting the "respond" action from the console external data entry device 111 in such a way that the selecting console is then responsible for the event. Responses to events typically include various types of communications responsive to resolve event, such as calling police, paramedics, or fire fighting assistance. Some events simply require reading and/or acknowledging by a dispatcher. Other event handling involves issuing commands to a communication unit that reprogram the communication unit's functionality. An event moves from the responded state 205 to the deleted state 207 when the event is deleted at a console other than the present console. In the preferred embodiment, an event is typically deleted when a console operator deems that processing for an event is complete. The console operator then selects the event and selects the "delete" action from the external data entry device 111. In addition, it is possible that an event may be placed in the deleted state by the event manager 113 if the event becomes stale, such as when responding to the event is no longer productive or otherwise useful due to the age of the event, system resources require the deletion of lesser priority events, and so forth. An event moves from the responded state to the clear state 209 when the present console has deleted the event by sending a delete request to the event manager 113. In the preferred embodiment, clearing an event involves removing the event from the console's display 109. An event moves from the deleted state 207 to the clear state 209 when an event deleted by another console is deleted by the present console in order to remove the event from the console's display 109. An event may move from the clear state 209 or the deleted state 207 to the responded state 205 when any console 101 or 117 updates an event to the responded state 205 via a request to the event manager 113. An event may move from the clear state 209, deleted state 207, or responded state 205 to the received state 201 when any console 101 or 117 requests that an event be updated to the received state 201 via a request to the event manager 113. Transitions shown with a solid line are used in the preferred embodiment, whereas transitions shown with a dashed line are optional transitions.

Figure 3:
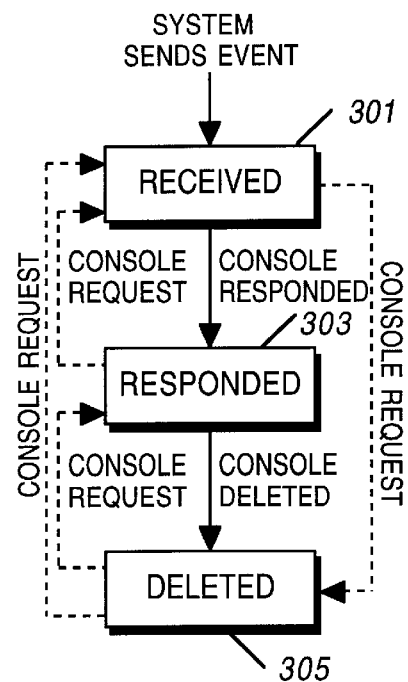
FIG. 3 is a state diagram showing the various states of an event at an event manager in accordance with the invention.

A state diagram showing the various states of an event at an event manager 113 is shown in FIG. 3. An event manager 113 distinguishes up to three states for each event: received 301, responded 303, and deleted 305, which are states corresponding to the received 201, responded 205, and deleted 207 states used within a console 101. An event enters the event manager 113 via the system, and in the preferred embodiment through the system controller 115. The event transitions from the received state 301 to the responded state 303 when any console responds to the event. An event changes from the responded state 303 to the deleted state 305 when any console deletes the event via a request to the event manager 113. An event may transition from the received state 301 to the deleted state 305 via console requests to the event manager 113. Similarly an event may transition from the deleted state 305 to the responded state 303, or from the responded state 303 to the received state 301, or from the deleted state 305 to the received state 301 via a console request to the event manager for such a particular transition. Transitions shown with a solid line are used in the preferred embodiment, whereas transitions shown with a dashed line are optional transitions.

In the preferred embodiment, the event manager 113 places events in the received state upon receipt of the event from a system controller 115, and places events in the responded or deleted states upon request from a console 101. In the preferred embodiment, the consoles place events in either the recognized or cleared states upon entry by an operator of the console 101. The transitions shown in the state diagrams in FIG. 2 and FIG. 3 are illustrated in a different way via the flowcharts of FIG. 4 and FIG. 5.

Figure 4:
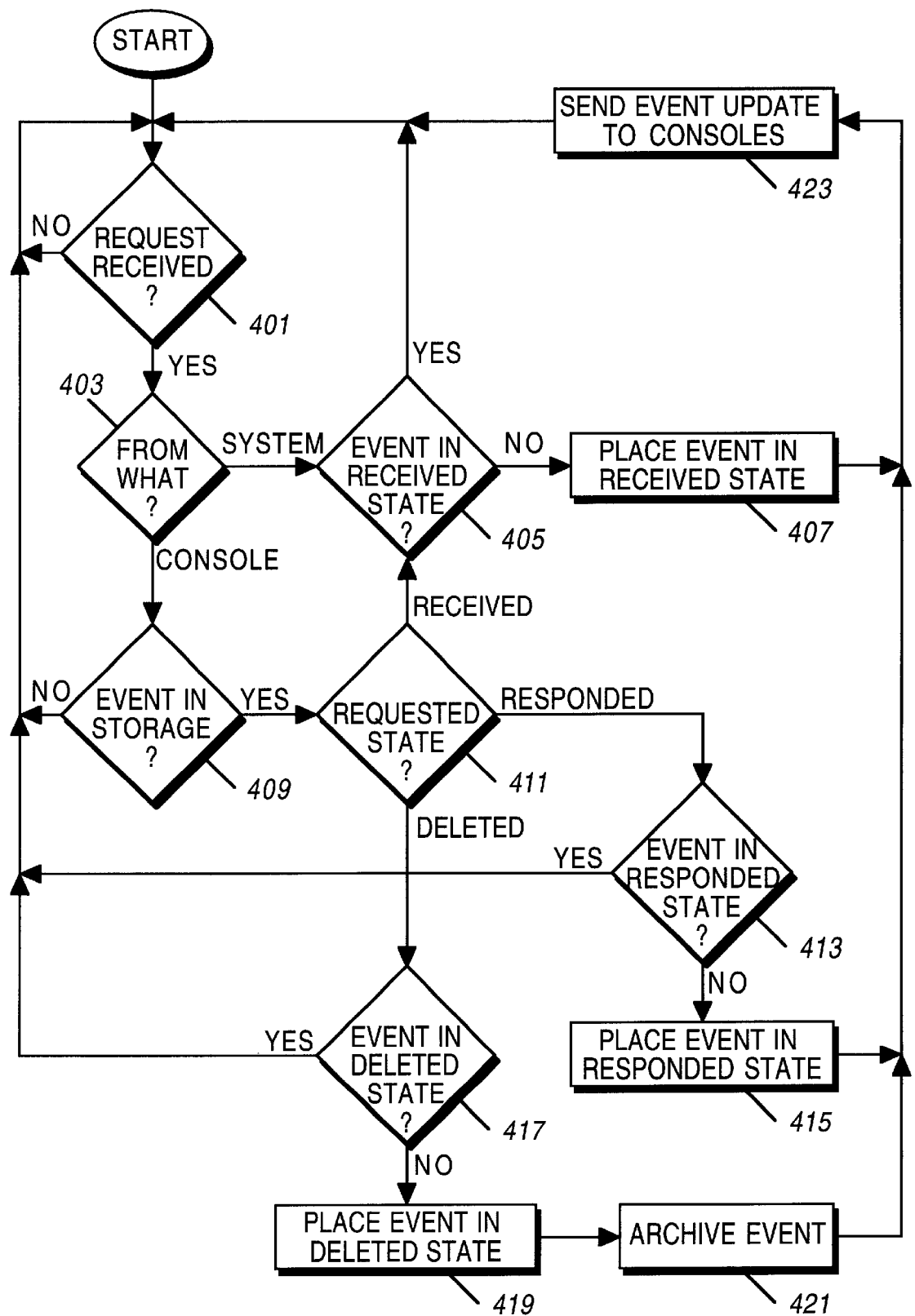
FIG. 4 is a method of processing an event by an event manager in accordance with the invention.

A method of processing an event by an event manager is shown in the flowchart of FIG. 4. At step 401, it is determined if the event manager 113 has received an update request from one of the consoles 101 or 117 or from the system controller 115. If a request has been received at step 401, the process continues with step 403, where it is determined from what device the request was received. If the request was received from the system, in the preferred embodiment via the system controller 115, the process continues with step 405, where it is determined if the event is already in the received state. If the event is already in the received state at step 405, the process continues with step 401 because there is no information that requires updating and no state to change. If the event is not in the received state at step 405, the process continues with step 407, where the event is placed in the received state, and the process continues with step 423. If at step 403 the request is received from a console, the process continues with step 409. At step 409, it is determined if the event is already in storage at the event manager 113. If it is not already in storage, the process continues with step 401. If the event is in storage, the process continues with step 411, where the requested state for the event is determined from the update request. If at step 411, the requested state is the received state, the process continues with step 405, as described above. If at step 411 the requested state is the responded state, the process continues with step 413, where the present state of the event is determined, i.e., whether or not the state of the event is responded prior to receipt of the update request. If at step 413 the event is already in the responded state, the event manager 113 ignores the request because there is no information that requires updating and no state to change, and continues the process with step 401. If at step 413 the event is not in the responded state, the process continues with step 415, where the event is placed in the responded state, and the process continues with step 423.

If at step 411, the requested state is the deleted state, the process continues with step 417, where it is determined if the state of the event prior to the request is the deleted state. If at step 417 the event is already in the deleted state, the event manager 113 ignores the request because there is no information that requires updating and no state to change, and continues the process with step 401. If at step 417 the event is not in the deleted state, the process continues with step 419, where the event is placed in the deleted state. After step 419, the event is archived at step 421, and the process continues with step 423. Archiving an event includes archiving information related to the event such as tracking information, including, inter alia, the identification of the console(s) that responded to and deleted the event, the identification of the dispatcher or operator who was operating the console, the times at which the event was responded to and deleted, and what entity, system or event manager 113, deleted the event in the case when a console did not delete the event. At step 423, the event manager 113 sends an event update to the consoles 101 and/or 117 that have an interest in this particular event, and the process continues with step 401. A console operator may be interested in a particular event when, for example, the console operator has an affiliation with the communication unit that submitted the message that the event relates to, such as an agency. For example, a request for police assistance would be forwarded to police console operators, but not to console operators working for the fire department or the dog pound. In the preferred embodiment, events are only allowed to transition from the received state to the responded state, and from the responded state to the deleted state at the event manager 113 to insure that events are handled at a console 101 in an efficient and reasonable order. Similarly, in the preferred embodiment, events are only allowed to transition from the received state to either the recognized or the responded state, and from the responded state to the deleted state or the clear state at the consoles 101 or 117. Event states and state changes, as well as event tracking information, are stored in a database within the event manager 113. In the preferred embodiment, the tracking information also includes talkgroup identifications, communication unit or radio identifications, the radio user's location, a unique event identifier, time and date of receipt of the event, and so forth.

Figure 5:
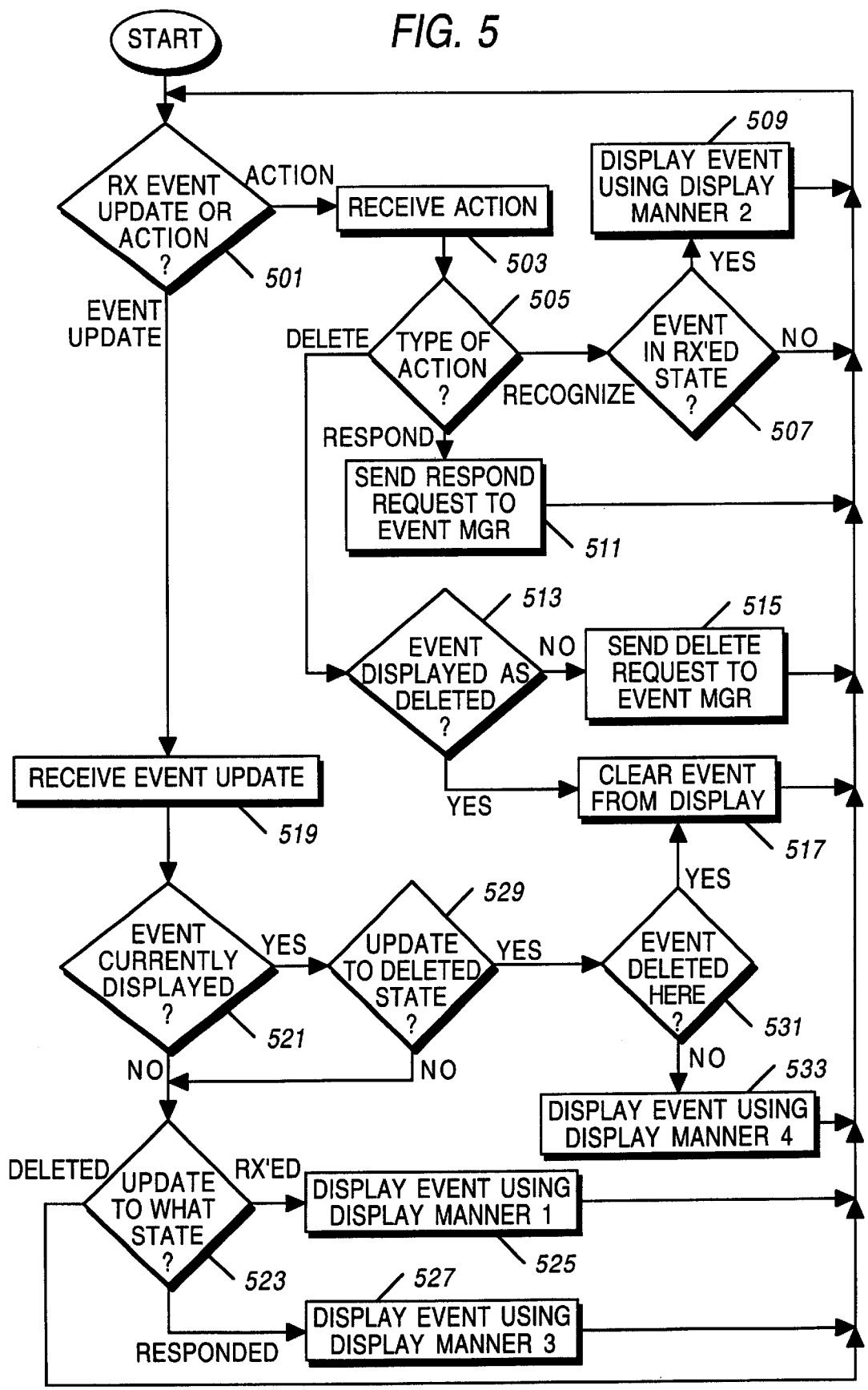
FIG. 5 is a method of processing and displaying an event at a console in accordance with the invention.

A method of processing and displaying an event at a console is shown in the flowchart of FIG. 5. At step 501, it is determined if the console has received an event update or a user action. A user action, also known as an operator instruction, is an entry or request made by the operator of the console with respect to a particular event. An action is typically made by the operator selecting an icon and then clicking on a particular function button, such as recognize, respond, or delete. At step 503, the console receives this particular action and continues with step 505, where it is determined what type of action was taken. If a recognized action was received, the process continues with step 507 where it is determined if the event is in the received state. If the event is not in the received state the process continues with step 501, because it is assumed that the recognizing of an event that is not in the received state is an improper action, and thus no further action is taken based on this particular event. If the event is in the received state at step 507, the process continues with step 509, where the event is displayed using display manner 2, and the process continues with step 501. When events are displayed using display manner 2, the event is placed in the recognized state only at the recognizing console 101 but the state of the event is otherwise unchanged at any other console 117 by this action. All of the consoles 101 and 117 may show an event in the recognized state, but each console 101 and 117 would have placed the event in the recognized state individually. If at step 505, the type of action is a respond action, then a respond request is sent to the event manager at step 511, and the process continues with step 501. If at step 505, the action is a delete action, the process continues with step 513, where it is determined if the event is displayed as deleted, i.e., in display manner 4, at the present time. If the event is not displayed as deleted, a request to delete this event is sent to the event manager at step 515, and the process continues with step 501. If at step 513, the event is displayed as deleted, the event is then cleared from the display at step 517, and the process continues with step 501. The clearing step, similar to the recognizing step, only occurs at the console clearing the event.

In the preferred embodiment, events must transition through the responded state in order to reach the deleted state. In other words, events may not transition from the received or recognized states directly into the deleted state. The descriptions herein describe optional transitions between states that are not part of the preferred embodiment, for example, as illustrated by dashed lines in FIG. 2 and FIG. 3.

If at step 501, an event update is received, the event update is accepted and processed at step 519. The process then continues with step 521, where it is determined if the event is currently displayed. If the event is not currently displayed, the process continues with step 523, where the state of the event is determined from the event update. If the new state is the received state, the process continues with step 525, where the event is displayed using display manner 1, and the process continues with step 501. If at step 523 the new state is the responded state, the process continues with step 527, where the event is displayed using display manner 3, and the process continues with step 501. In the preferred embodiment, display manner 3 includes updating tracking information such as the identification of the console 101 or 117 that responded to the event and the time when the event was responded to by the console 101 or 117. If at step 523, the new state is the deleted state, the process continues with step 501, because it is assumed that the attempt to delete an event that is currently not being displayed is an error, and thus no action is taken. Alternatively, the event may be displayed using display manner 4. If at step 521, the event is currently being displayed, the process continues with step 529 where it is determined if the update places the event in the deleted state. If the update is not a transition to the deleted state, the process continues with step 523. If the update is a transition to the deleted state, then the process continues with step 531, where it is determined if the event was deleted at this particular console. If the event was deleted at this particular console, the process continues with step 517, where the event is cleared from the display and the process continues with step 501. In the preferred embodiment, the event is cleared from the display immediately upon requesting deletion of an event by the deleting console 101 or 117. If at step 531, the event was not deleted at this console, the process continues with step 533, where the event is displayed using display manner 4. In the preferred embodiment, display manner 4 includes updating tracking information such as the identification of the console 101 or 117 that deleted the event and the time when the event was deleted by the console 101 or 117. If the event was deleted by the event manager 113 or other mechanism, such information would be displayed.

The various manners of display include audible alarm, color, font, size change, change in shape of icon depicting the event, darkening or lightening of the event, highlighting of a border or other device around the icon, blinking LEDs, muting audible sounds, and so forth. The particular way utilized by each of the display manners may be optimized to quickly distinguish between the states of various events.

An example of how an event may be processed through a system of consoles, such as one shown in FIG. 1, is as follows. The system controller 115 receives a particular event, in this instance a call for emergency medical assistance. The system controller 115 receives the event and forwards it to the event manager 113. The event manager 113 processes the event, places it in the received state and stores it as such, then sends an event update to each of the consoles 101 and/or 117 that could possibly respond to this particular emergency request. Each of these consoles 101 and/or 117, upon receiving this event, displays the event using display manner 1, in this instance with audible beeping and a blinking icon. An operator of one of the consoles 117 realizes that he or she is unable to respond to this request for emergency medical assistance, but does not want to be disturbed on their present call by the beeping of this icon, and the console operator recognizes the event, the console then places the event in the recognized state and displays the event at the console 117 simply by a solid icon does not blink and does not provide an audible beeping. The operator of console 101, realizing that he/she is able to handle this request for emergency medical assistance, then selects this event, and attempts to respond to the event by pressing the "respond" entry on the console for this particular event. The console then sends a respond request to the event manager 113, which then places the event in the responded state, and sends an event update to all the consoles, which when they receive the event update, display the event using display manner 3, which in this case changes the icon from its present state to a solid icon that is a different color at all consoles where this event is being displayed. When the operator of the console 101 that responded to the event, completes the activities in response to the event, the operator selects the icon, and the "delete" entry on the console 101. The console then sends a delete request to the event manager 113, which processes the request to place the event in the deleted state. The event manager 113 places the event in the deleted state, stores the event, and then archives the event and sends an event update for this event to the consoles 101 and 117. That event update is then processed by each of the consoles 101 or 117 as follows. The deleting console 101, which deleted the event, clears the event completely from the screen of the console. All consoles 117 that did not delete the event then display the event using display manner 4, which is a gray shaded outline of the same event. When each of the console operators deletes this event from display manner 4, the event is cleared from each particular display.

Some of the advantages of the present invention are that complete traceability of the audit trail for any event is provided within the system automatically. In the case of a shut down or system crash, the exact status of each event is maintained and accessible at each display. Quick distinction in simple management of events by each dispatcher are provided by the use of different states as well as different display mechanisms for each state. The distinctive features of each state of the radio event life cycle provide a high level management structure with clear, consistent interface to dispatchers. The state features may be redefined for each event type, i.e., new emergencies are displayed red, and new status events are displayed green. The recognized state is used to silence a single event and is local to the dispatchers screen, while all others are managed by a system database and propagated to all dispatchers. A complete audit trail of who caused each state change and the time of occurrence is maintained. An event which is retried by the radio user while displayed in the recognized state will transition back to the received state. The deleted state will be displayed to all dispatchers for consistency, and optionally for the possibility of reopening the event should reopening be necessary.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of handling an event by a plurality of dispatch consoles, the method comprising the steps of:

receiving an event at a communication system;

displaying the event at at least two of the plurality of dispatch consoles, wherein the event is displayed using a first manner of indication on each of the at least two of the plurality of dispatch consoles;

when the event is recognized by a first console of the at least two consoles, displaying the event on the first console using a second manner of indication in response to the recognition, and each of the at least two consoles that is not the first console continues displaying the event using the first manner of indication;

responding to the event by a second console;

after the event is responded to by the second console of the at least two consoles, displaying the event on the at least two consoles using a third manner of indication; and wherein at least two of the first manner of indication, the second manner of indication, and the third manner of indication are different from each other.

2. The method of claim 1, further comprising the step of, after the event is responded to, deleting the event, by a deleting console of the at least two consoles, and displaying the event on each of the at least two consoles that is not the deleting console using a fourth manner of indication and discontinuing the displaying of the event on the deleting console, wherein the first manner of indication, the second manner of indication, and the third manner of indication are each different from the fourth manner of indication.

3. The method of claim 2, further comprising the step of archiving the event upon deletion.

4. The method of claim 2, further comprising, after the step of deleting, the step of clearing the event from display, by any of the at least two consoles that is not the deleting console, without affecting display of the event on any other of the at least two consoles.

5. The method of claim 2, further comprising the steps of tracking event information, including the deleting console's identification and when the event was responded to, and which of the at least two consoles deleted the event and when the event was deleted, and displaying the event information on one or more of the at least two consoles.

6. The method of claim 2, further comprising the step of, after the event is deleted, reviewing the event on one or more of the at least two consoles that is not the deleting console by selecting the event in its fourth manner of indication.

7. The method of claim 2, further comprising, after deletion of the event, the step of responding to the event by one of the at least two consoles, and after the one of the at least two consoles responds to the event, displaying the event on the one of the at least two consoles using the third manner of indication.

8. The method of claim 1, wherein the first console is the second console.

9. A method of handling an event by a plurality of dispatch consoles, the method comprising the steps of:

receiving an event at a communication system;

displaying the event at at least two of the plurality of dispatch consoles, wherein the event is displayed using a first manner of indication on each of the at least two of the plurality of dispatch consoles;

when the event is recognized by a first console of the at least two consoles, displaying the event on the first console using a second manner of indication in response to the recognition, and each of the at least two consoles that is not the first console continues displaying the event using the first manner of indication;

deleting, by a deleting console of the at least two consoles, the event, and displaying the event on each of the at least two consoles that is not the deleting console using a third manner of indication and discontinuing the displaying of the event on the deleting console; and wherein at least two of the first manner of indication, the second manner of indication, and the third manner of indication are different from each other.

10. The method of claim 9, further comprising the step of archiving the event upon deletion.

11. The method of claim 9, further comprising, after the step of deleting, the step of clearing the event from display, by any of the at least two consoles that is not the deleting console, without affecting display of the event on any other of the at least two consoles.

12. The method of claim 9, further comprising the steps of tracking event information, including the deleting console's identification and when the event was deleted, and displaying the event information on one or more of the at least two consoles.

13. The method of claim 9, further comprising the step of, after the event is deleted, reviewing the event on one or more of the at least two consoles that is not the deleting console by selecting the event in its third manner of indication.

14. The method of claim 9, further comprising, after deletion of the event, the step of responding to the event by one of the at least two consoles, and after the one of the at least two consoles responds to the event, displaying the event on the one of the at least two consoles using a fourth manner of indication, wherein the first manner of indication, the second manner of indication, and the third manner of indication are each different from the fourth manner of indication.

15. The method of claim 9, wherein the first console is the second console.

* * * * *